July 7, 1953     J. E. ORMESHER     2,644,269
LIVE BAIT CONTAINER
Filed Nov. 5, 1948
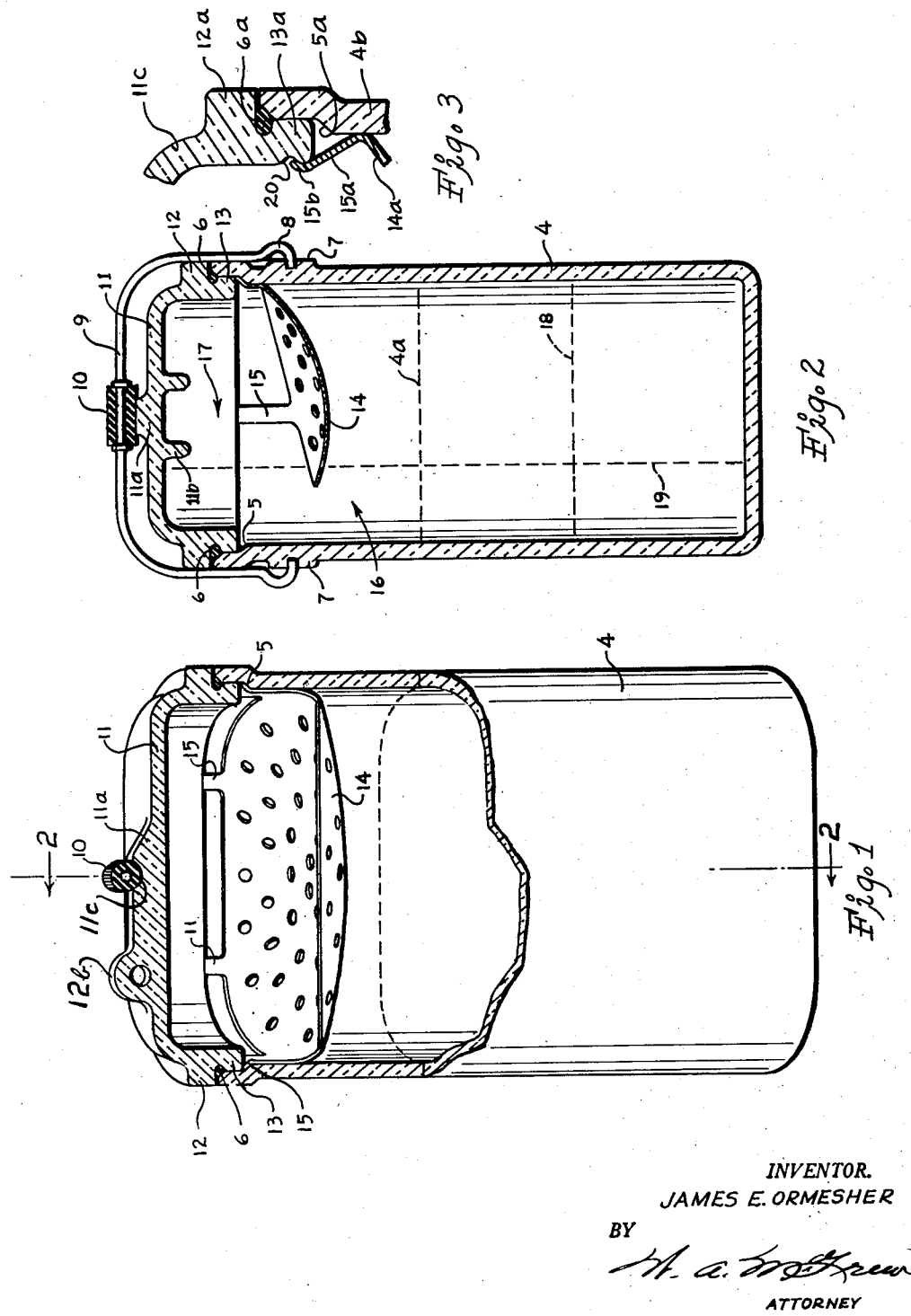
INVENTOR.
JAMES E. ORMESHER
BY
ATTORNEY Patented July 7, 1953

2,644,269

UNITED STATES PATENT OFFICE 2,644,269

LIVE BAIT CONTAINER

James E. Ormesher, Valentine, Nebr.

Application November 5, 1948, Serial No. 58,440

7 Claims. (Cl. 43—55)

This invention relates to new and useful improvements in live bait containers for fishing and more particularly to live minnow receptacles; an important object being to provide one which may be transparent for observation of the condition of the minnows, and hermetically sealed to prolong the lives of the minnows, hellgramites or other bait.

Another object of the invention is to provide a container of this class having a minnow trap or sieve adjacent the top thereof adapted to be conveniently reached into with the fingers during fishing for the selection of a minnow for baiting a hook without undue disturbance of other minnows in the container or contamination of the water by contact with the hand.

A further object of the invention is to provide an arrangement of a minnow sieve in a sealed water-tight container whereby the latter may be carried in a coat pocket and when bait is desired, removed therefrom, simply inverted, then righted to trap, one or more minnows in such sieve for ready baiting of the fishing hook, without danger of leakage or water or injury to the minnows.

A still further object of the invention is to provide a simple and inexpensive minnow container, which will carry minnows for a longer period of time and more minnows for the same period of time for the volume of water used; one which can be made in various shapes and colors, of various materials, carried in a variety of ways, refrigerated, and easily rinsed and cleaned.

Other objects and advantages of the invention will become apparent during the course of the following description, of which the accompanying drawing forms a part, and wherein the preferred embodiments of the invention are illustrated and described for purposes of illustration and not for limitation.

In the accompanying drawing,

Fig. 1 is a front elevation of my improved minnow receptacle with the upper portion thereof shown in section to illustrate the construction and the oval cross-section of the receptacle;

Fig. 2 is a vertical cross-section of the receptacle taken along the line 2—2 at right angles to the view in Fig. 1; and Fig. 3 is an enlarged fragmentary section of a portion of the upper edge of the modified receptacle cover and trap illustrating the manner of mounting the trap or sieve on the cover so as to be lifted from the receptacle when the cover is removed therefrom.

Referring now to the drawing, the numeral 4 designates the body of a container, preferably in the form of a transparent glass jar which is oval in cross-section to readily fit within a fisherman's coat pocket, or to be suspended from a fisherman's side if it be desired to carry or suspend the receptacle otherwise. The container is preferably filled approximately two-thirds with water up to the level shown by the dotted line 4a, leaving approximately one-third of the container filled with air. While it is desirable to make the container oval in cross-section and transparent for observation of the condition and locations of the minnows, it will be understood that it can be made flask-shape, round in cross section or in other shapes; translucent, non-transparent in various colors, and of metal, plastics or any other suitable material. The upper open end or top of the container is slightly enlarged in circumference and is provided with an internal circumferentially extending shoulder or ledge 5. The top edge of the container has a bevel, as shown, for seating of a rubber gasket 6 to hermetically seal the container and to render it leak-proof for very definite purposes to be presently described. Opposite sides of the container adjacent the top thereof, are provided with indented integral bosses 7 into which are sprung the inturned ends 8 of a cover fastening bail 9 which has a rubber roller 10 rotatably mounted thereon intermediate the ends thereof.

A transparent glass inverted cup-shaped cover or closure 11 with interior ribs 11b and an inclined exterior cam track 11a having a hollow 11c as shown in Figs. 1 and 2, is raised integrally from the center of the cover and the track serves to tighten the bail 9 against the cover when the bail is swung to the position shown in Figs. 1 and 2 and its roller 10 seats in the hollow 11c of the cam track. This also clamps the gasket 6 between the cover and container to form an air and liquid tight seal, and thereby exclude air from the container and prevent leakage of water when the container is inverted to trap some of the minnows, as will be presently described. This raised cam track 11a is provided with an apertured portion 12b for the attachment of a shoulder strap, not shown, by which the minnow container may be slung from a fisherman's shoulder, or submerged in the stream for cooling purposes. The formation of the cover 11 is such that it has an external circumferential shoulder 12 conforming to the cross-section shape of the container to overlap the upper open end thereof, and a correspondingly shaped inner flange 13 which fits into said open top to be disposed just above the interior shoulder 5.

In order to facilitate removing minnows from the container without frightening them or dipping the hand into the water in the container 4, a minnow trap or sieve element 14 is arranged in novel relationship to the container and cover and is provided with a series of spaced apart upstanding marginal fingers 15 terminating in outwardly inclined ends adapted to removably engage over the shoulder 5 to support the sieve adjacent the upper end of the container where it is readily accessible for picking out minnows trapped upon the same, or the sieve may be bodily removed from the container for this purpose. The flange 13 of the closure 11 is disposed directly above the shoulder 5 and the upper ends of the fingers 15 which hold the sieve in place when the container is inverted. The sieve is of scoop or dipper-shape and while conforming to the cross-sectional shape of the container to fit snugly against the inner circumference or periphery of the container, is smaller than such cross-section so that one side of the sieve is spaced a distance from one wall of the container to form an entrance 16 to a trapping chamber 17, part of which is formed by said cover 11. This sieve is normally arranged in the downwardly inclined position shown, so that those trapped minnows not to be used presently, may be brushed back into the water below or will flip back by themselves. To derive this inclined position, the securing fingers 15 are longer as they approach the lip or mouth edge of the sieve. This sieve may well be made of a plastic, glass, rubber, metal or the like and may be finished in a dark color, such as dark grey, green, brown, or black, to induce minnows to swim down under the dark colored sieve when the container is inverted to trap them, as they naturally swim downwardly when disturbed.

Normally the container stands upright with the water level approximately shown at the dotted line 4a, Fig. 2. With minnows therein and it being desirable to trap one or more upon the sieve 14 for bait purposes, the container is inverted so as to transfer the water level to approximately the dotted lines 18 when the container is up-side down, so that the minnows naturally dive for the bottom and thus swim through the mouth 16 of the trap and into the trapping chamber 17 between the sieve 14 and the cover 11. When the container is immediately righted again the water level is again established at 4a leaving one or more of the minnows caught or "beached" upon the top of the sieve, whereupon the cover 11 is removed and the trapped minnow removed through the open top of the container. Should it be desired to keep one or more minnows swimming in the trapping chamber 17, the container, as illustrated in Fig. 2, is laid upon its right-hand side after having been first inverted so as to establish the water level at approximately the dotted line 19 which would be below the free margin of the sieve to retain the trapped minnow between the sieve and cover 11 in chamber 17. When desired to remove this minnow, the container is simply up-ended to normal position and the water-tight cover removed to reach the minnow on the sieve.

In the modification shown in Fig. 3 of the drawing those parts which correspond to those of Figs. 1 and 2 have corresponding numerals with a letter "a" coefficient added, with the exception of the cover which is 11a and body which is 4b. Here, the sieve 14a has an angular resilient and preferably imperforate upward extension or portion 15a formed with an outturned flange 15b which extends around the back and side edges of sieve 14a to snap and hook into an internal groove 20 arranged on the inner surface of the cover flange 13a so that the trap sieve is removably secured to the cover 11c and is thus removed as a scoop unit from the container when the cover is removed, with a minnow or minnows upon the sieve trapped as disclosed for the form of invention disclosed in Figs. 1 and 2.

From the foregoing description, it will be obvious that the container may be made of any desired size or shape to be carried wherever most convenient to the fishermen. From past experience it is apparent that minnows in average size ventilated containers move and thrash about more vigorously and drive and consume oxygen from the water more rapidly than when the container is made smaller, as in those carrying up to one gallon of water in a hermetically sealed state with approximately 1/3 of the container filled with atmospheric air with free oxygen and 2/3 full of water.

Its unique trapping and draining arrangement with transparent container and cover makes selection of bait without undue disturbance of the minnows a simple and quick operation. Various changes in the size, shape and relation of parts may be resorted to without departing from the spirit of the invention.

What I claim as new is:

1. A live minnow container having a closure adapted to hermetically seal said container, and a sieve element disposed transversely across said container below but adjacent to said closure to define a trapping chamber between said closure and sieve element with a passage into said trapping chamber from the container below, said container being adapted to be inverted to permit minnows to swim into said trapping chamber and then restored to its original position to drain the trapped minnows upon said sieve element in position to be removed upon removal of said closure.

2. Structure as recited in claim 1, in which said sieve element is of a dark color to entice minnows therebeneath when said container is in inverted position, and said element is submerged beneath said water level.

3. Structure as recited in claim 1, in which said container is provided with a shoulder and said sieve element is provided with means detachably engaging said shoulder to normally support said element above said water level.

4. Structure as recited in claim 1, in which said closure is of inverted cup-shape to afford greater space in said trapping chamber, and said sieve element is arranged very close to the top of said container.

5. Structure as recited in claim 1, in which said container is of oval shape in cross-section and said sieve element is smaller than said cross-section of the container but is in contact with the walls of said container except along a portion thereof to define said passage, and said sieve element is of saucer shape and inclined downwardly toward said water level.

6. Structure as defined in claim 1, and wherein said container is also adapted to be positioned upon its side to submerge said sieve element all except one edge thereof whereby minnows remain trapped in the water in said trapping chamber.

7. Structure as defined in claim 1, in which said sieve element is spaced from one side wall of said container to define said passage into said trapping chamber.

JAMES E. ORMESHER.

References Cited in the file of this patent

UNITED STATES PATENTS

| Number | Name | Date |
|---|---|---|
| 110,148 | Leach | Dec. 13, 1870 |
| 284,523 | Whiteman | Sept. 4, 1883 |
| 419,520 | Hauck | Jan. 14, 1890 |
| 996,731 | Searles | July 4, 1911 |
| 1,048,766 | Tucker | Dec. 31, 1912 |
| 1,269,902 | Butler | June 18, 1918 |
| 1,986,742 | Mosher | Jan. 1, 1935 |

FOREIGN PATENTS

| Number | Country | Date |
|---|---|---|
| 102,384 | Germany | Mar. 21, 1899 |
| 223,727 | Great Britain | Oct. 30, 1924 |